United States Patent Office 3,244,715
Patented Apr. 5, 1966

3,244,715
PHENYLIMIDAZO[4,5-d]PYRIDAZINES
Raymond N. Castle, Albuquerque, N. Mex., assignor to Smith Kline & French Laboratories, Philadelphia, Pa., a corporation of Pennsylvania
No Drawing. Filed Oct. 30, 1964, Ser. No. 407,851
10 Claims. (Cl. 260—250)

This invention relates to imidazo[4,5-d]pyridazines, in particular to phenylimidazo[4,5-d]pyridazines having diuretic, antibacterial, and antiparasitic activities and to intermediates for the preparation thereof.

The compounds of the invention are represented by the following structural formulas:

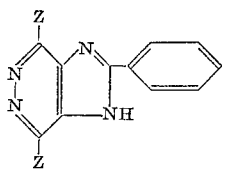

(I)    (II)

Wherein Z is amino, methylamino, ethylamino, dimethylamino, diethylamino, hydrazino, mercapto, methylthio, ethylthio, chloro, or hydroxy.

Compounds of the invention in which Z is amino, methylamino, ethylamino, dimethylamino, diethylamino, or hydrazino are diuretic and antibacterial agents, being effective in inhibiting the growth of *Staphylococcus aureus*. The preferred compounds in this group are 2-phenyl-4,7-diaminoimidazo[4,5-d]pyridazine and 2-phenyl-4,7-bis-(methylamino)imidazo[4,5-d]pyridazine.

The compounds of Formula I in which Z is chloro or hydroxy have been found to have antiparasitic activity, in particular against Trichomonas.

The compounds of the invention in which Z is mercapto, methylthio, ethylthio, or hydroxy are intermediates useful in preparation of the compounds having diuretic and anti-Trichomonal activity.

The compounds of Formula I are prepared by a procedure which may be best understood by reference to Chart A below.

ethylamino, dimethylamino, diethylamino, or hydrazino.

The starting material for the preparation of the novel 2-phenylimidazopyridazines is 2-phenylimidazole-4,5-dicarboxylic acid dihydrazide (III). This compound is prepared by the condensation with ethanolic hydrazine of the corresponding diester, which in turn is readily available by a modification of the synthetic method of Fargher and Pyman, J. Chem. Soc. 115, 217 (1919).

Compound III is cyclized to 2-phenyl-4,7-dihydroxy-imidazo[4,5-d]pyridazine (IV) by heating in 10% hydrochloric acid solution. The anti-Trichomonal dichloro compound V is prepared by allowing this diol to react with boiling phosphorus oxychloride. Either the diol or the dichloride may be converted to a dithiol compound (VI, in which R=hydrogen) by treatment with phosphorus pentasulfide in boiling pyridine solution. The dithiol compound may be mono- or dialkylated by treatment with one or two moles, respectively, of a reagent such as methyl or ethyl iodide in alkali. The dichloride V can also be hydrolyzed with glacial acetic acid to the chloro hydroxy compound VII, which possesses anti-Trichomonal activity.

The various thiol and alkylthio compounds VI are intermediates for the preparation of the 2-phenyl-4,7-amino-(or substituted amino)-imidazo[4,5-d]pyridazine compounds, since the sulfur atom is replaceable by an amino or hydrazino group. This latter reaction is carried out by amination with an ethanolic solution of an amine or ammonia in a rocking autoclave or refluxing on the stream bath with hydrazine.

Compounds of Formula II are prepared by the following synthetic routes, which are illustrated in Chart B.

The cis isomer of compound IX [J. Amer. Chem. Soc. 52, 3405 (1930)] or its lower alkyl ester is refluxed with hydrazine in a solvent such as methanol or ethanol to give the dibromophenylpyridazinone X. Reaction of this compound in a stainless steel, rocking autoclave at about 190–220° C. with a large excess of ammonia yields a mixture of bromo amino isomers (XI), which is then converted to a mixture of amino hydrazino isomers (XII) by refluxing with excess hydrazine in a solvent. The mixture is then converted to the diamino compound XIII by hydrogenation under the influence of a Raney nickel catalyst at atmospheric pressure and temperatures from room temperature to about 50° C., in an alcohol solvent. Treatment with phosgene results in ring closure to the useful intermediate 7-phenylimidazo[4,5-d]pyridazine-2,4-dione (XIV).

CHART A

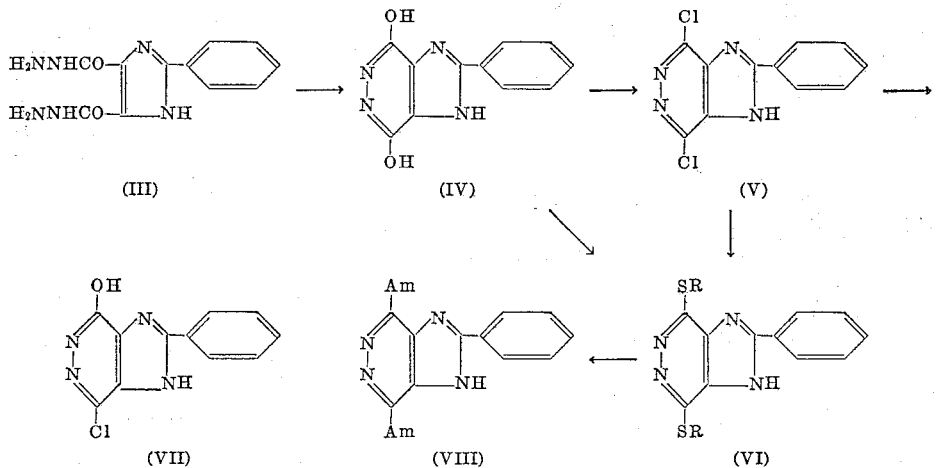

In Formula VI, R represents hydrogen, methyl, or ethyl, and in Formula VIII, Am represents amino, methylamino, From this compound different routes are available to place other substituents at the 2 and 4-positions.

CHART B

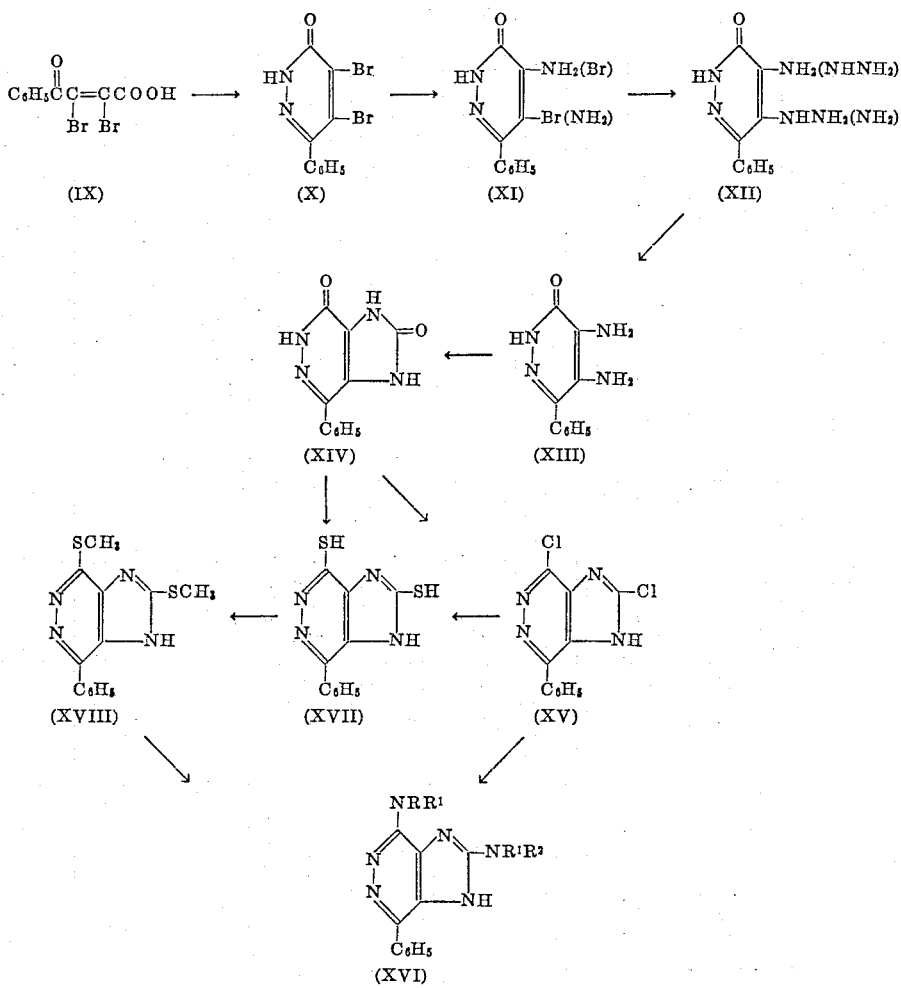

Compound XIV may be refluxed for five to ten hours with phosphorus pentasulfide in pyridine in order to form the dithiol XVII. Alkylation with a lower alkyl halide or sulfate, e.g., methyl iodide, in aqueous or alcoholic alkali with vigorous stirring gives a compound such as the bis(methylthio)compound XVIII. This compound is then heated under pressure in an autoclave with ammonia, a primary amine, or a secondary amine to give the desired amino compound, XVI, in which $R^1$ and $R^2$ may be hydrogen or lower alkyl and are obviously dependent upon the choice of the amine reactant. Compound XVIII may also be treated with hydrazine to give an analog of compound VXI, having hydrazino groups at the 2 and 4-positions.

The dione XIV is alternatively refluxed with phosphorus oxychloride in dimethylaniline to give the dichloro compound XV, which is convertible to amino compounds by heating for five to twelve hours at 190–220° C. with an amine or ammonia under pressure in an autoclave, or alternatively to a dithiol by heating with phosphorus pentasulfide in pyridine.

It should be noted that tautomerism can exist in the case of certain oxo or hydroxyimidazopyridazines, and that a particular structure or nomenclature designation for such a compound is understood to represent the compound in a possible mixture with its tautomer.

It will be apparent that certain variants of the starting materials can be employed in the above-described series of reactions, and that the final products produced therefrom will correspondingly bear these variants. In particular, the phenyl groups on the starting materials can bear a methyl, methoxy, chloro, or trifluoromethyl group in the o, m, or p-positions thereof, and phenyl-disubstituted imidazo[4,5-d]pyridazines prepared therefrom will also have such substituents on the phenyl group. These modifications are obvious variations of the unsubstituted phenyl compounds and are to be considered the full equivalents thereof.

Other obvious variations include the substitution of certain secondary heterocyclic amines for ammonia or the lower alkyl amines in the displacement reaction with phenyl-dichloroimidazo[4,5-d]pyridazines or the dithio compounds. These variants include piperidine, morpholine, N-methylpiperazine, and pyrrolidine. The products resulting from their reaction with the dichloro compound are obvious modifications of the compounds of the invention and are considered the full equivalents thereof.

Also considered equivalent to the compounds specifically claimed are the homologous lower alkyl and di-lower alkyl amino compounds, such as 2-phenyl-4,7-bis(propylamino)imidazo[4,5-d]pyridazine, 2-phenyl-4,7-bis(dispropylamino)imidazo[4,5-d]pyridazine, 2-phenyl-4,7-bis(butylamino)imidazo[4,5-d]pyridazine, and 2-phenyl-4,7-bis(dibutylamino)imidazo[4,5-d]pyridazine.

The following examples constitute the best mode known to the inventor for preparing the compounds of the invention. These examples are to be considered illustrative, and not limitative of the scope of the invention.

*Example 1.—2-phenylimidazole-4,5-dicarboxylic acid*

One mole of tartaric acid (150 g.) is partially dissolved in a mixture of 324 ml. each of concentrated and fuming nitric acids. Concentrated sulfuric acid (600 ml.) is added gradually to the solution while stirring and maintaining a temperature of 38–43° with a water bath. Toward the end of the addition, white crystalline tartaric acid dinitrate begins to separate.

After thorough chilling, the dinitrate is filtered as dry as possible on a Büchner funnel lined with Pyrex wool. The dry cake is transferred in portions to ca. two liters of crushed ice, with stirring to dissolve each portion. The cold (−5°) mixture is further chilled to −10° and neutralized with concentrated ammonium hydroxide (400–600 ml.) at −5° to −10° (1 hour).

Ammonium hydroxide (300 ml.) is added to the neutral solution followed by one mole of freshly distilled benzaldehyde (106 g.) The mixture is stirred vigorously at 0° for 7 hours. After 3–4 hours the solid cream-colored 2-phenylimidazole-4,5-dicarboxylic acid begins to separate. The cold mixture is neutralized with concentrated hydrochloric acid. The product is collected and air-dried, yielding 139 g. (60%), M.P. 265–270° with effervescence.

*Example 2.—2-phenylimidazole-4,5-dicarboxylic acid dihydrazide*

Crude 2-phenylimidazole-4,5-dicarboxylic acid (139 g., 0.6 mole) is suspended in absolute ethanol (1.8 liters) and the suspension saturated with dry hydrogen chloride at room temperature with stirring for ca. 8 hours. The solution is filtered and the filtrate evaporated under reduced pressure on the steam bath until only a brown sludge remains. At this point, the diethyl ester is obtained by recrystallization from aqueous ethanol yielding white needles, M.P. 190°.

The crude ester is dissolved in absolute ethanol (600–700 ml.) and 95% hydrazine (77 g., 2.4 moles) added to the chilled solution, followed by refluxing for 2 hours. The granular cream-colored dihydrazide is collected, washed with cold ethanol and air-dried, yielding 125 g. (80%) of crude product. The product is soluble in pyridine, hot dilute hydrochloric acid, cold potassium hydroxide solution and difficultly soluble in water and ethanol. Recrystallization from 95% ethanol gives a pure white powder, M.P. above 360°.

*Example 3.—4,7-dihydroxy-2-phenylimidazo [4,5-d]pyridazine*

2-phenylimidazole-4,5-dicarboxylic acid dihydrazide (19.5 g., 0.075 mole) is dissolved in 300 ml. of hot 10% hydrochloric acid (moist dihydrazide from the previous reaction may be used) and the solution refluxed for 1 hour. The relatively pure product is collected, washed with water and air-dried, yielding 15.9 g. (94%). The product is soluble in pyridine, dilute potassium hydroxide solution, hot glacial acetic acid, and relatively insoluble in water and ethanol. Recrystallization from aqueous pyridine gives a white powder, M.P. 390°.

*Example 4.—2-phenylimidazo [4,5-d]pyridazine-4,7-dithiol*

To a solution of 4,7-dihydroxy-2-phenylimidazo[4,5-d]-pyridazine (22.8 g., 0.1 mole) in 350 ml. of dry freshly distilled pyridine is added 133.4 g. of phosphorus pentasulfide in portions with stirring and cooling. The mixture is refluxed with stirring for 1 hour. Cooling yields yellow crystals of excess phosphorus pentasulfide which are removed. The excess pyridine is removed from the dark filtrate by distillation under reduced pressure to about one-third of the original volume. Water (ca. 50 ml.) is added cautiously to the residue and the mixture heated on the steam bath for 1 hour. After the evolution of hydrogen sulfide has subsided, the hot solution is filtered with suction, cooled, and acidified with 10% hydrochloric acid to pH 1. The yellow-brown solid is collected, washed with water and air-dried, giving 24.7 g. (95%) of crude product. Repeated recrystallization from absolute ethanol gives a yellow powder, M.P. 230–232°.

*Example 5.—4,7-bis(methylthio)-2-phenylimidazo [4,5-d]pyridazine*

Semipure 2-phenylimidazo[4,5-d]pyridazine-4,7-dithiol (20.8 g., 0.08 mole) is dissolved in 350 ml. of 1 N potassium hydroxide solution. Methyl iodide (25.0 g., 0.176 mole) is added all at once and the dark brown opaque two-phase system is stirred vigorously at room temperature for 2 hours. The dark solution is filtered and the filtrate acidified to pH 6 with glacial acetic acid. A large quantity of a pink-grey precipitate is collected and washed with water. Upon warming on the steam bath, water of hydration separates and is decanted off leaving a dark brown hardened gum. The crude yield is 19.7 g. (85%). Repeated crystallization from methanol gives cream-colored needles, M.P. 195–197°.

*Example 6.—4(7)-methylthio-2-phenylimidazo [4,5-d]pyridazine-7(4)-thiol*

2-phenylimidazo[4,5-d]pyridazine-4,7-dithiol (2.6 g., 0.01 mole) is dissolved in 50 ml. of 1 N potassium hydroxide solution. Methyl iodide (1.42 g., 0.01 mole) is added and the dark mixture stirred at room temperature for 1 hour. After filtration and acidification to pH 6 with glacial acetic acid, a purple-grey solid precipitates. The solid is collected, washed with water and air-dried, yielding 2.3 g. (89%) of crude product. Upon recrystallization from absolute ethanol, a pale yellow flocculent solid is obtained, M.P. 303–305°.

*Example 7.—4,7-bis(ethylthio)-2-phenylimidazo [4,5-d]pyridazine*

2-phenylimidazo[4,5-d]pyridazine-4,7-dithiol (13.0 g., 0.05 mole) is dissolved in 250 ml. of 1 N potassium hydroxide solution and alkylated with ethyl iodide (0.1 mole), following the procedure of Example 5. There is obtained 10.08 g. (70%) of crude product. Recrystallization from absolute methanol gives cream-colored granular crystals, M.P. 182–184°.

*Example 8.—4(7)-ethylthio-2-phenylimidazo [4,5-d]pyridazine-7(4)-thiol*

2-phenylimidazo[4,5-d]pyridazine-4,7-dithiol (2.6 g., 0.01 mole) is dissolved in 50 ml. of 1 N potassium hydroxide solution and alkylated with ethyl iodide (1.56 g., 0.01 mole) in the same manner as in Example 6. The crude product amounts to 2.0 g. (69%). Repeated crystallization from absolute methanol gives a light yellow powder, M.P. 306–307°.

*Example 9.—4,7-diamino-2-phenylimidazo [4,5-d]pyridazine*

Dry, pure 4,7-bis(methylthio)-2-phenylimidazo[4,5-d]-pyridazine (4 g., 0.014 mole) is placed in a chilled 500 ml. stainless steel autoclave with 250 ml. of absolute ethanol saturated with ammonia. The autoclave is sealed and rocked for ca. 20 hours at an internal temperature of 220°. A clear yellow-brown solution with an intense odor of methylmercaptan is obtained. The solution is evaporated to dryness on the steam bath whereupon a cream-colored solid weighing 2.4 g. (71%) is obtained. After several recrystallizations from water, fine white needles of the monohydrated product are obtained. The hydrate melts at 183–200° and the anhydrous form melts at 283–285°.

*Example 10.—4,7-bis(methylamino)-2-phenylimidazo[4,5-d]pyridazine*

Two-hundred milliliters of cold absolute ethanol are saturated with dry methylamine (24.5 g.). 4,7-bis (methylthio)-2-phenylimidazo[4,5-d]pyridazine (5.77 g., 0.02 mole) and the ethanolic solution of methylamine are placed in a 500 ml. stainless steel autoclave which is rocked at 190–200° for 8.5 hours. The volume of the light-brown solution obtained from the cooled autoclave is evaporated to ca. 50 ml. A white powder is collected by chilling. This is washed with a small amount of cold ethanol, and air-dried, yielding 5.53 g. (quantitative). The product is recrystallized from either ethanol or water, yielding fine white needles, M.P. 310–313°.

Use of 35.6 g. of ethylamine in the above procedure instead of methylamine results in the formation of 4,7-bis (ethylamino)-2-phenylimidazo[4,5-d]pyridazine.

Use of 35.6 g. of dimethylamine in the above procedure instead of methylamine results in the formation of 4,7-bis (dimethylamino)-2-phenylimidazo[4,5-d]pyridazine.

Use of 57.8 g. of diethylamine in the above procedure instead of methylamine results in the formation of 4,7-bis (diethylamino)-2-phenylimidazo[4,5-d]pyridazine.

*Example 11.—4,7-dihydrazino-2-phenyl-imidazo[4,5-d]pyridazine*

4,6 - bis(methylthio) - 2 - phenylimidazo[4,5 - d]pyridazine (4.63 g., 0.016 mole) is dissolved in 30 ml. of 96% hydrazine and the solution heated on the steam bath for 3 hours. Gradual addition of water to the chilled solution precipitates a white solid which is collected, washed with cold water and air-dried. The 4,7-dihydrazino-2-phenyl-imidazo[4,5-d]pyridazine obtained (3.6 g., 0.014 mole) is dissolved in absolute ethanol. Dry hydrogen chloride gas is gently bubbled through the chilled solution for 6 hours during which time a white solid gradually precipitates. The solid is collected, washed with cold ethanol, and air-dried. Four grams (quantitative yield) of product is obtained. Recrystallization from ethanol-water gives a pure white powder, M.P. 260–261°.

*Example 12.—4,7-dichloro-2-phenyl-imidazo[4,5-d]pyridazine*

4,7-dihydroxy-2-phenylimidazo[4,5-d]pyridazine (22.8 g., 0.1 mole) is refluxed with phosphorus oxychloride (265 ml.) for 9 hours during which time the white solid gradually dissolves. Three-fourths of the excess phosphorus oxychloride is removed under reduced pressure and the brown syrup-like residue is poured cautiously with stirring into ca. 1 liter of crushed ice, taking particular care to maintain a temperature near 0°. The coral-colored solid which separates is filtered quickly from the acid solution, washed thoroughly with cold water, and air-dried, giving 19.8 g. (75%) of crude product. Repeated crystallization from absolute ethanol yields fine light yellow needles, M.P. 282–284°.

*Example 13.—4(7)-chloro-7(4)-hydroxy-2-phenylimidazo[4,5-d]pyridazine*

4,7-dichloro-2-phenylimidazo[4,5-d]pyridazine (26.5 g., 0.1 mole) is refluxed with glacial acetic acid (200 ml.) until the solid has dissolved (1 hour). Coling of the solution yields fine white needles which are collected with suction, washed with water and air-dried. The product is recrystallized from glacial acetic acid, M.P. 358–360°.

What is claimed is:

1. A compound of the structure

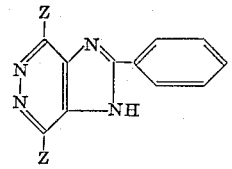

wherein Z is selected from the group consisting of amino, methylamino, ethylamino, dimethylamino, diethylamino, hydrazino, mercapto, methylthio, ethylthio, chloro, and hydroxy.

2. 4,7-dihydroxy-2-phenylimidazo[4,5-d]pyridazine.
3. 2-phenylimidazo[4,5-d]pyridazine-4,7-dithiol.
4. 4,7 - bis(methylthio) - 2 - phenylimidazo[4,5 - d] pyridazine.
5. 4,7-bis(ethylthio)-2-phenylimidazo[4,5-d]pyridazine.
6. 4,7-diamino-2-phenylimidazo[4,5-d]pyridazine.
7. 4,7-bis(methylamino)-2-phenylimidazo[4,5-d]pyridazine.
8. 4,7-dihydrazino-2-phenylimidazo[4,5-d]pyridazine.
9. 4,7-dichloro-2-phenylimidazo[4,5-d]pyridazine.
10. A compound selected from the group consisting of 4-chloro-7-hydroxy-2-phenylimidazo[4,5-d]pyridazine and 7-chloro-4-hydroxy-2-phenylimidazo[4,5-d]pyridazine.

No references cited.

NICHOLAS S. RIZZO, *Primary Examiner.*